US007854116B2

(12) United States Patent
Hancock, Sr.

(10) Patent No.: US 7,854,116 B2
(45) Date of Patent: Dec. 21, 2010

(54) HYDRAULIC PUMP FLOW SHUT-OFF VALVE

(76) Inventor: Leonard H. Hancock, Sr., 130 Shetland Dr., Hummelstown, PA (US) 17036

( * ) Notice: Subject to any disclaimer, the term of this patent is extended or adjusted under 35 U.S.C. 154(b) by 513 days.

(21) Appl. No.: 11/893,987

(22) Filed: Aug. 17, 2007

(65) Prior Publication Data

US 2008/0110509 A1 May 15, 2008

Related U.S. Application Data

(60) Provisional application No. 60/838,919, filed on Aug. 18, 2006.

(51) Int. Cl.
*F16D 31/02* (2006.01)

(52) U.S. Cl. .......................................... 60/450; 60/452

(58) Field of Classification Search .................. 60/443, 60/450, 452
See application file for complete search history.

(56) References Cited

U.S. PATENT DOCUMENTS

| | | | | |
|---|---|---|---|---|
| 4,523,430 | A * | 6/1985 | Masuda | 60/450 |
| 4,821,514 | A * | 4/1989 | Schmidt et al. | 60/452 |
| 5,095,697 | A * | 3/1992 | Kauss | 60/452 |
| 6,874,318 | B1 * | 4/2005 | MacLeod | 60/452 |

OTHER PUBLICATIONS

Parker Hannifin Corporation; Series PAVC Variable Displacement, Piston Pumps; Catalog 2600-101-2/US; (5 pages).

* cited by examiner

*Primary Examiner*—Michael Leslie
(74) *Attorney, Agent, or Firm*—The Webb Law Firm

(57) ABSTRACT

A load sense valve assembly includes a first valve in flow communication with a pump discharge line, a second valve in flow communication with the first valve, and a third valve in flow communication with the first valve. The first valve can be a solenoid actuated directional control valve. The second and third valves can be hydraulic pilot actuated directional control valves.

16 Claims, 2 Drawing Sheets

HYDRAULIC PUMP FLOW SHUT-OFF VALVE

CROSS-REFERENCE TO RELATED APPLICATIONS

This application claims priority to U.S. Provisional Application No. 60/838,919 filed Aug. 18, 2006, which is herein incorporated by reference in its entirety.

BACKGROUND OF THE INVENTION

1. Field of the Invention

This invention relates generally to industrial and mobile hydraulic systems utilizing a variable volume (displacement) pump of the pressure and flow compensated (load sense) control type and, in one specific embodiment, to a valve or valve assembly configured to provide a soft or transitioned start or stop.

2. Technical Considerations

The utilization of variable volume pumps equipped and controlled by pressure and flow compensated (load sense) type valving in power transmission hydraulic systems is becoming more and more popular. This increased popularity is due, at least in part, to increased operational functionality, versatility and efficiency of hydraulic circuits and systems using this type of pump when compared to systems using various other pump types. The input power to drive these pumps is commonly supplied by an engine or motor of some type.

At times it may be desired to start or stop the fluid flow from the pump to the downstream components without stopping or disengaging the input power source from rotating the pump input shaft. Examples of such would be to shut off the pump flow supply to circuit components in the event of a fluid transmission line (hose) failure that may result in a fluid leak or spill or as a means to prevent undesired operation of system functions when the pump input power is being provided by a directly connected engine in a motor vehicle. Stopping the flow to these components by blocking or shutting off the flow from the pump outlet port can result in potentially harmful or dangerous hydraulic system operating characteristics, such as rapid and/or high pressure rises, commonly referred to as "spikes". Spikes can occur in situations such as when the pump supply path is closed to flow while the system is at operational pressure or such as when the path closure rate is faster than the rate at which the pump displacement control system can respond. Spikes can also occur when the pump supply path is opened to flow when an operational pressure signal is present on the load sense control valve or when the valve flow path opening rate results in an excessive pump flow and pressure output due to pump displacement control system response lag. These characteristics can cause hydraulic system and pump powertrain component failure.

Therefore, it would be beneficial to provide a means of shutting off and/or turning on the flow from the pump outlet port in such a manner as to reduce or eliminate at least some of these undesired operational characteristics.

SUMMARY OF THE INVENTION

The invention teaches that the above object may be accomplished by providing a valve assembly having components that interact in such a manner that will yield the opening and closing of the pump supply to downstream operational circuit components in conjunction with and in transitional sequence with controlling the load sense pressure communicated to the pump control valve that commands the pump to produce a flow output as required in the operational state or to return to the standby state. These operational and sequential characteristics can be accomplished by a valve assembly comprising valves and/or valve components, interconnecting flow pathways and pilot chambers assembled and/or connected in a manner in accordance with the invention, resulting in a valve assembly that shall be referred to herein as a "load sense shut-off valve" (LSSV).

One valve assembly of the invention comprises components grouped together in such a manner as to interact and to provide for the flow path and operational characteristics in a similar or like manner as herein set forth and as represented in the accompanying figures and written description.

An exemplary load sense valve assembly of the invention comprises a first valve in flow communication with a pump discharge line, a second valve in flow communication with the first valve, and a third valve in flow communication with the first valve. The first valve comprises a solenoid actuated directional control valve. The second and third valves comprise hydraulic pilot actuated directional control valves. Hydraulic flow limiting valves can be present in the flow paths between two or more of the valves.

A hydraulic system, comprising: a pump; a control valve in flow communication with the pump; and a load sense valve assembly in flow communication with the pump and the control valve, the load sense valve assembly comprising: a first valve comprising a solenoid activated directional control valve; a second valve connected to the first valve, the second valve comprising a hydraulic pilot actuated directional control valve; and a third valve connected to the first valve, the third valve comprising a hydraulic pilot actuated directional control valve.

A load sense valve assembly for a hydraulic system, the load sense valve assembly comprising: a first valve connected to a variable displacement hydraulic pump and a hydraulic system control valve, the first valve comprising a solenoid actuated three-way/two-position hydraulic directional control valve; a second valve connected to the first valve and to a valve outlet part to selectively direct fluid to downstream system components, the second valve comprising a pilot actuated two-way/two-position directional control valve; and a third valve is connected to the first valve, a load sense flow and pressure signal line from the downstream system components, and to an outlet load sense flow and pressure signal line connected to the system control valve, wherein the second and third valves are connected to an output of the first valve such that a flow path state of the first valve simultaneously affects a flow path state of the second and third valves, wherein the valve assembly as claimed in claim 11, wherein the valve assembly has a first configuration in which hydraulic fluid supplied to the first valve is directed to a pilot chamber of the second valve and a pilot chamber of the third valve such that fluid flow to downstream operators is blocked and the pump increases displacement to maintain a pre-set load sense differential standby pressure at an input part of the valve assembly, wherein the valve assembly as claimed in claim 11, wherein the valve assembly has a first configuration in which hydraulic fluid supplied to the first valve is directed to a pilot chamber of the second valve and a pilot chamber of the third valve such that fluid flow to downstream operators is blocked and the pump increases displacement to maintain a pre-set load sense differential standby pressure at an input part of the valve assembly, and wherein the valve assembly as claimed in claim 11, wherein the valve assembly has a second configuration in which hydraulic fluid supplied to the first valve is directed to the second valve and to downstream operators, and wherein the pump is controlled to maintain a pressure at an input part of the valve assembly equal to a pre-set load sense differential pressure plus a system demand operating pressure.

DETAILED DESCRIPTION OF INVENTION

Figure 1:
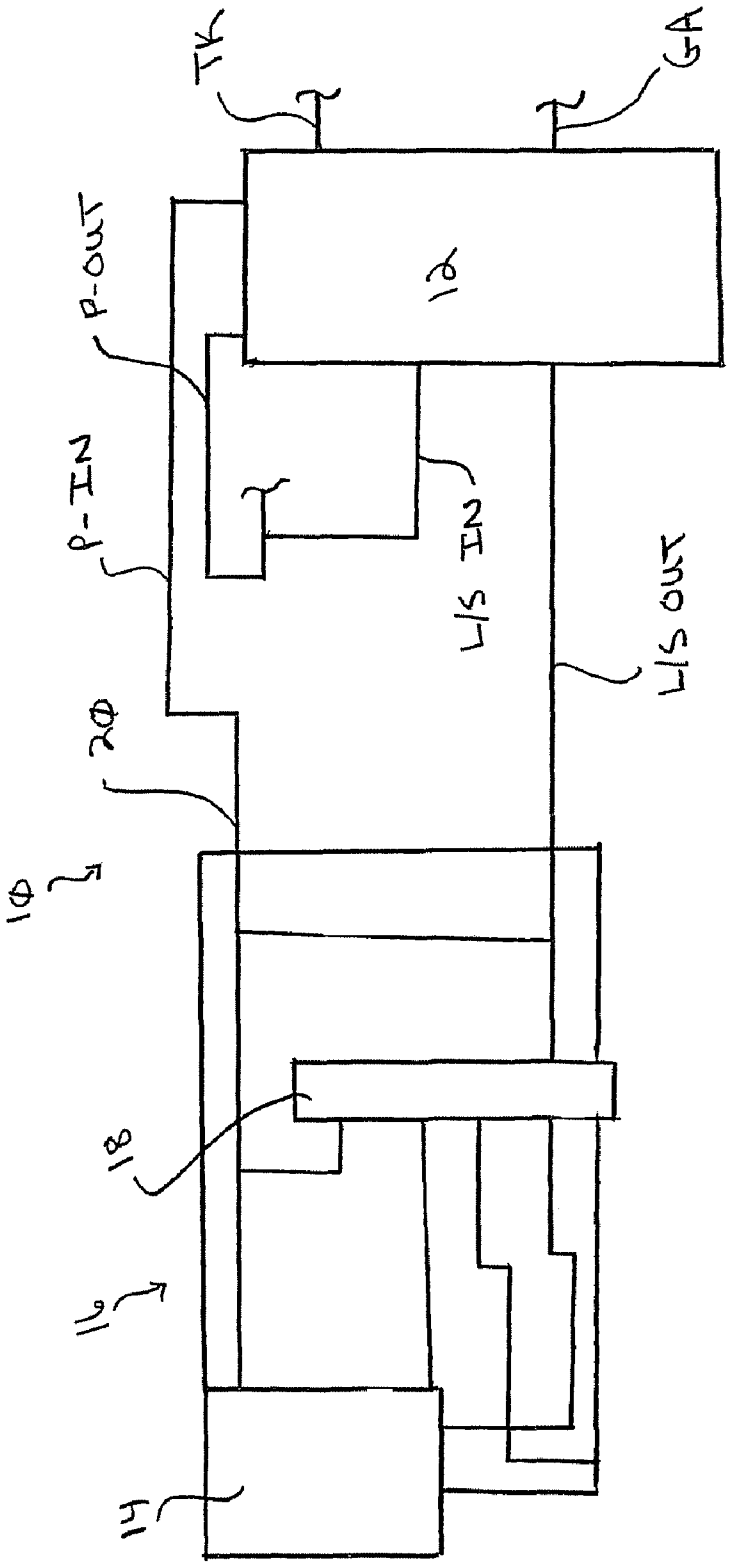
FIG. 1 is a schematic drawing (not to scale) of a hydraulic system incorporating a valve assembly of the invention.

As used herein, spatial or directional terms, such as "top", "bottom", "left", "right", "over", "under", "front", "rear", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification, figures, and claims are to be understood as being modified in all instances by the term "about". Accordingly, unless indicated to the contrary, the numerical values set forth in the following specification, figures, and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. All references referred to herein are to be understood to be incorporated by reference in their entirety.

A hydraulic system 10 incorporating a load sense shut off valve (LSSV) assembly 12 of the invention is shown in FIG. 1. The hydraulic system 10 includes a pump 14, a control valve assembly 16, and the load sense valve assembly 12 of the invention. In the illustrated embodiment, the pump 14 is a conventional swashplate pump and the control valve assembly 16 includes a conventional spring-biased control valve 18. A discharge line 20 is in flow communication with the pump 14. The structure and operation of a conventional pump 14 and control valve assembly 16 will be well understood by one of ordinary skill in the art and, hence, will not be described in detail herein. An example of one such pump and control valve assembly is commercially available from the Parker Hannifin Corporation under the trade name Series PAVC and is described in the Parker Hannifin Corporation catalog 2600-101-2/US at pages A63-A69, which is herein incorporated by reference.

Figure 2:
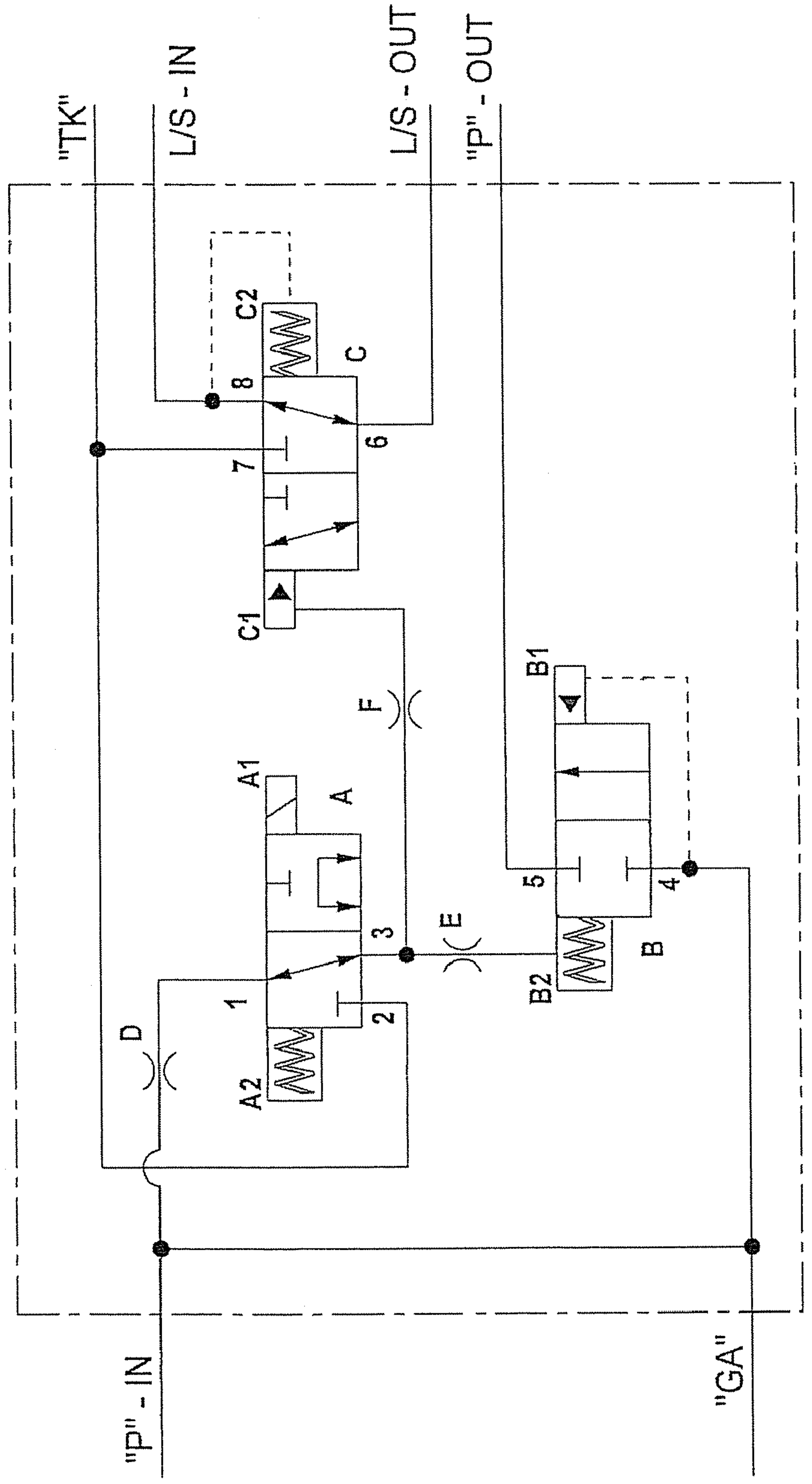
FIG. 2 is a schematic diagram (not to scale) of a valve assembly of the invention.

As shown in FIGS. 1 and 2, the load sense valve assembly 12 of the invention is in flow communication with the pump 14 and the control valve assembly 16. The exemplary load sense valve assembly 12 shown in FIG. 2 incorporates three flow control valves (A-C) which function as follows. However, it is to be understood that the invention is not limited to the specific exemplary structure shown in FIG. 2. Any apparatus to achieve the operational performance described below could be used.

Valve A

Valve A is an electric solenoid actuated three-way/two-position (3W/2P) hydraulic directional control valve cartridge. Valve A can be a full shift or proportional shift type dependent upon operating characteristics desired. An exemplary valve suitable for valve A is commercially available as HydraForce model SV10-31-0-N-12DW.

At Rest (Not Actuated)

With the solenoid (A1) de-energized, the valve spool is positioned by the force exerted by the biasing spring (A2) to allow bidirectional flow from path positions 1 to 3. In this state, port 2 is blocked to flow.

Actuated

With solenoid (A1) energized and developing a force exerted on the valve spool greater than the force exerted by the biasing spring (A2), the valve spool is positioned to allow bidirectional flow from path positions 2 to 3. Port 1 is blocked to flow.

Valve B

Valve B is a hydraulic pilot actuated two-way/two-position (2W/2P) hydraulic directional control valve cartridge. An exemplary valve suitable for valve B is commercially available as HydraForce model EP16-S35-0-N-20.

At Rest (Not Actuated)

With the force applied to the valve spool at the pilot pressure chamber (B1) being less than the combined force of the biasing spring and the pilot pressure within the spring chamber (B2) or within a chamber exerting a force to position the valve in the same direction as the spring force, the valve spool is positioned to block the flow path from position 4 to 5.

Actuated

With the force applied to the valve spool at the pilot pressure chamber (B1) being greater than the combined force of the biasing spring and the pilot pressure within the spring chamber (B2) or within a chamber exerting a force to position the valve in the same direction as the spring force, the valve spool is positioned to allow flow from path positions 4 to 5.

Valve C

Valve C is a hydraulic pilot actuated three-way/two-position (3W/2P) hydraulic directional control valve cartridge. An exemplary valve suitable for valve C is commercially available as HydraForce model PD10-41-0-N-60.

At Rest (Not Actuated)

With the force applied to the valve spool at the pilot pressure chamber (C1) being less than the combined force of the biasing spring and the pilot pressure within the spring chamber (C2) or within a chamber exerting a force to position the valve in the same direction as the spring force, the valve spool is positioned to allow bidirectional flow from path positions 6 to 8. Port 7 is blocked to flow.

Actuated

With the force applied to the valve spool at the pilot pressure chamber (C1) being greater than the combined force of the biasing spring and the pilot pressure within the spring chamber (C2) or within a chamber exerting a force to position the valve in the same direction as the spring force, the valve spool is positioned to allow bidirectional flow from path positions 6 to 7. Path 8 is blocked to flow.

Valves D, E, and F

The valve assembly 12 can also include flow limiting valves. In the embodiment illustrated in FIG. 2, hydraulic flow limiting valves D, E, and F can be of the fixed and/or variable flow type and can be of the pressure compensated and/or non-compensated type. These flow limiting valves D-F can be used to buffer and/or control the flow rates into and out of their corresponding port or chamber position. Size and flow rate capacity will very dependent upon operating characteristics desired.

Port Connections

The valve assembly 12 can be installed in a hydraulic system in such a manner to provide for fluid flow connections referenced on FIG. 2 as follows:

"P-IN": Valve inlet port for main discharge flow provided by the variable volume pump 14 equipped with a pressure and flow (Load Sense) type control valve.

Since the valve assembly 12 of the invention is used to shut off pump flow to downstream components during normal and emergency shutdown situations, this port can be directly connected to the pump outlet port, such as by a conventional SAE split flange bolt type port connection, without any inner connecting fluid hoses or adaptors. Of course, any conventional connection could alternatively be used.

"TK": Valve outlet port with flow referenced to low circuit pressure or to oil reservoir.

"P-OUT": Valve outlet port directing pump flow to downstream system components when valve A is activated (on) by energizing the solenoid (A1).

"L/S-IN": Valve inlet port for load sense flow and pressure signal from downstream circuit operational components.

"L/S-OUT": Valve outlet port for load sense flow and pressure signal referenced to the variable volume pump load sense control valve signal inlet port.

"GA": Valve outlet port providing for a means of connection of diagnostic gauges and/or various instrumentations.

Operation of the valve assembly of the invention will now be described.

Solenoid (A1) de-energized

With solenoid (A1) de-energized, the valve assembly 12 is in what is considered as the "off" position. In this state, when hydraulic flow is supplied to the "P-IN" port by a variable volume pump 14 equipped with a load sense type control valve 18, the components of the valve assembly 12 of the invention interact and provide the operational characteristics as follows.

As pump output flow enters the "P-IN". port of the valve assembly 12, the flow is directed by means of flow pathways (cores) to path 1 of valve A, through valve D (if present), to path 4 of valve B and to the "GA" port. Flow entering path 1 is directed to path 3. Flow out of path 3 goes to pilot chamber C1, through valve F (if present) and to pilot chamber B2, through valve E (if present). Since the at rest position of valve B is spring biased to block the 4 to 5 flow path and since the flow from path 3 is directed to blind, i.e., non-flow through pilot chambers, the pressure in the "P-IN" cores starts to increase. This pressure is equally applied to pilot chamber B1 due to the inner connection to flow path 4 and to pilot chamber B2. With pilot pressures at B1 and B2 being equal, the biasing spring force keeps the 4 to 5 flow path of valve B closed.

The pump output will continue to increase pressure in the "P-IN" port and the inner connected flow paths and cores to a level equal to the pump control valve load sense differential pressure (as described in the Parker Hannifin Corporation catalog referenced above) plus the load sense pressure communicated to the pump control valve 18 from the "L/S-OUT" port of the valve assembly 12. With the 4 to 5 flow path of valve B being blocked, there is no pump flow directed to the downstream circuit components. Therefore, the pressure at the "L/S-IN" port will be zero or referenced to a reservoir return circuit pressure. When the pressure in the pilot chamber C1 reaches a level high enough to exert a force greater than the spring bias force, plus any force due to the reservoir return circuit pressure at C2, valve C will be actuated to open the 6 to 7 flow path and to block path 8. This will result in the "L/S-OUT" port and the inner connected pump control valve load sense port pressure being equal to zero or to the reservoir return circuit pressure.

The result of these simultaneous valve operations is that pump flow supplied from the "P-OUT" port to downstream circuit operations is blocked and that the variable volume pump 14 will decrease displacement to the point of producing the flow rate required only to maintain the pre-set load sense differential standby pressure at the "P-IN" port, commonly referred to as being in the "standby" state. When in this operational state, the valve is referred to as being in a "shutdown" mode.

Solenoid (A1) Energized

With solenoid (A1) energized, the valve assembly 12 is in what is considered as the "on" position. In this state, when hydraulic flow is supplied to the "P-IN" port by the pump 14 the valve components of the valve assembly 12 interact and provide the operational characteristics as follows.

As pump output flow enters the "P-IN" port of the valve assembly 12, the flow is directed by flow paths (cores) to path 1 of valve A, through valve D (if present), to path 4 of valve B and to the "GA" port. With valve A actuated, flow entering path 1 is blocked and the bidirectional flow path 3 to 2 is opened. Flow from pilot chamber C1, through valve F (if present), and from pilot chamber B2, through valve E (if present), is referenced to the "TK" port by the 3 to 2 flow path. This results in a pressure reduction in the C1 and B2 pilot chambers to a level equal to the pressure at the "TK" port. With this pressure reduction the pressure in B1, communicated from path 4, reaches a level greater than the combined force of the biasing spring and the pilot pressure within the spring chamber (B2) or within a chamber exerting a force to position the valve in the same direction as the spring force, resulting in an open flow path from 4 to 5 and thus from the "P-IN" to the "P-OUT" ports. Since the pump flow is now connected to downstream circuit operations by the "P-OUT" port, the pump 14 will increase displacement to the point of producing the flow rate required to maintain a pressure at the "P-IN" port equal to the pre-set load sense differential pressure plus the load sense pressure communicated to the pump control valve from the "L/S-OUT" port of the valve assembly 12. When the spring bias force of valve C plus any force due to circuit pressure as seen at the "L/S-IN" port, and thus pilot chamber C2 communicated from path 8, reaches a level high enough to exert a force greater than the force exerted by the pressure in pilot chamber C1, being flow connected to the "TK" port by the 3 to 2 flow path, valve C will be actuated to open the bidirectional flow path 6 to 8 and to block path 7. This will result in the "L/S-OUT" port and the inner connected pump control valve load sense port pressure being equal to the system demand operating pressure as communicated to the "L/S-IN" port by the load sense network of the downstream circuit components. The pump control valve will then cause the necessary changes in pump displacement to be made to the point of producing the flow rate required to maintain a pressure at the "P-IN" port equal to the pre-set load sense differential pressure plus the system demand operating pressure as communicated to the "L/S-IN" port. When in this state, the valve assembly 12 shall be referred to as being in an "operational" mode.

Mode Transition

As described above, the transition from shutdown to operational modes, and visa versa, is accomplished by energizing or de-energizing the solenoid A1. This in turn controls the flow path state of valves B and C by controlling the pressure in pilot chambers B2 and C1 relative to the opposing forces within their corresponding valves as seen at B1 and C2. Whereas B2 and C1 are both connected to path 3 of valve A, the "on" or "off" condition of A1 solenoid and corresponding flow path state of valve A will affect the flow path state of valves B and C simultaneously. The opening and closing of the flow path from the "P-IN" port to the "P-OUT" port through the flow path of 4 to 5 in valve B is therefore in a direct relationship with the flow path state of valve C thus with the load sense pressure communicated to the pump control valve 18 through the "L/S-OUT" port. This direct relationship yields the transitional operating characteristics of:

1) Shutdown to Operational Mode

Valves B and C will remain in the "at rest" flow path positions due to the lack of pilot control pressure supply at paths 1 and 4, even if solenoid A1 is energized, until pump flow is supplied to the "P-IN" port.

When making the transition from shutdown to operational mode upon energizing solenoid A1, the 4 to 5 flow path is piloted to the opened position resulting in pump flow being supplied to the "P-OUT" port and thus to downstream circuit components. If these components are not operational, and therefore communicate a load pressure equal that of the tank return flow path due to the commonly used load sense pressure bleed-down circuit, the 6 to 8 flow path will be opened by the spring bias force within valve C since this force exceeds the differential of the pilot forces at C1 and C2. The load pressure requirement of circuit components downstream of the "P-OUT" port upon operation will be communicated to the pump load sense control valve 18 from the "L/S-OUT" port due to the 6 to 8 open flow path. Any additional load signal pressure applied to path 8 and therefore to C2 will further increase the forces maintaining this open path.

This load pressure signal will cause the pump load sense control valve system to increase pump displacement to the point of producing the flow rate required to maintain a pressure at the "P-IN" port equal to the pre-set load sense differential pressure plus the operational load pressure requirement. Valves D, E and F may be used to control the relative shift timing rate and shift sequence of valves B and C in order to obtain the desired operational characteristics. The interaction of these valves as described yields the opening of the pump supply to downstream operational circuit components in conjunction and in sequence with the communication of any load sense pressure to the pump control valve 18 commanding the pump to supply the flow and pressure required by the operational circuits. This direct interaction and transitional sequence will reduce or eliminate potentially harmful and/or dangerous hydraulic system operating spikes at the pump outlet port. These spikes can occur in situations such as when the pump supply path is opened to flow when an operational pressure signal is present on the load sense control valve 18 or when the valve flow path opening rate results in an excessive pump flow and pressure output due to pump displacement control system response lag. The interaction, shift timing rate and shift sequence transitional operating characteristics as provided by these valve components results is what may be referred to as a "soft shift" type control valve.

2) Operational to Shutdown Mode

When making the transition from operational to shutdown mode upon de-energizing solenoid A1, the operational load pressure of circuit components downstream of the "P-OUT" port communicated to the pump load sense control valve from the "L/S-OUT" port is reduced to a pressure level equal to the level at the "TK" port due to the 6 to 7 open flow path. This pressure reduction will cause the pump load sense control valve system to reduce pump displacement to the point of producing the flow rate required only to maintain the pre-set load sense differential standby pressure at the "P-IN" port. As this pressure reduction occurs, the 4 to 5 flow path is also piloted to the closed position resulting in no pump flow being supplied to the "P-OUT" port. Valves D, E and F may be used to control the relative shift timing rate and shift sequence of valves B and C in order to obtain the desired operational characteristics. The interaction of these valves as described yields the closing of the pump supply to downstream operational circuit components in conjunction with the load sense pressure communicated to the pump control valve commanding the pump to return to the standby state. This transition sequence will reduce or eliminate potentially harmful and/or dangerous hydraulic system operating characteristics such as pressure spikes at the pump outlet port that can occur when the pump supply path is closed to flow while the system is at operational pressure or occur when the path closure rate is faster than the rate at which the pump displacement control system can respond. It further results in minimizing the pressure being held in the flow passages from the pump outlet port to the "P-IN" port and from the "P-OUT" port to downstream circuit components of the closed center design. This interaction of valve components results in a soft shift type control valve operation.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A load sense valve assembly, comprising:

a first valve in flow communication with a pump discharge line, the first valve comprising a solenoid actuated directional control valve;

a second valve in flow communication with the first valve, the second valve comprising a hydraulic pilot actuated directional control valve; and a third valve in flow communication with the first valve, the third valve comprising a hydraulic pilot actuated directional control valve, wherein the second valve is connected to a valve outlet port to direct fluid flow to downstream system components.

2. The valve assembly of claim 1, wherein the first valve is an electric solenoid actuated three-way/two-position hydraulic directional control valve.

3. The valve assembly of claim 1, wherein the second valve is a hydraulic pilot actuated two-way/two-position hydraulic directional control valve.

4. The valve assembly of claim 1, wherein the third valve is a hydraulic pilot actuated three-way/two-position hydraulic directional control valve.

5. The valve assembly of claim 1, including a first hydraulic flow limiting valve in the flow path between the discharge line and the first valve.

6. The valve assembly of claim 1, including a second hydraulic flow limiting valve in the flow path between the first valve and the second valve.

7. The valve assembly of claim 1, including a third hydraulic flow limiting valve in the flow path between the first valve and the third valve.

8. The valve assembly as claimed in claim 1, connected to a pump assembly, the pump assembly comprising a variable displacement pump and a control valve.

9. A load sense valve assembly, comprising:

a first valve in flow communication with a pump discharge line, the first valve comprising a solenoid actuated directional control valve;

a second valve in flow communication with the first valve, the second valve comprising a hydraulic pilot actuated directional control valve; and a third valve in flow communication with the first valve, the third valve comprising a hydraulic pilot actuated directional control valve, wherein the third valve is connected to a load sense flow and pressure signal line from downstream operational components and is also connected to an outlet load sense flow and pressure signal line in flow communication with a control valve assembly of a pump.

10. A hydraulic system, comprising:

a pump;

a control valve in flow communication with the pump; and a load sense valve assembly in flow communication with the pump and the control valve, the load sense valve assembly comprising:

a first valve comprising a solenoid activated directional control valve;

a second valve connected to the first valve, the second valve comprising a hydraulic pilot actuated directional control valve; and a third valve connected to the first valve, the third valve comprising a hydraulic pilot actuated directional control valve, wherein the valve assembly has a first configuration in which hydraulic fluid supplied to the first valve is directed to a pilot chamber of the second valve and a pilot chamber of the third valve, such that fluid flow to downstream operators is blocked and the pump increases displacement to maintain a pre-set load sense differential standby pressure at an input port of the valve assembly.

11. The hydraulic system as claimed in claim 10, wherein the first valve is a solenoid actuated three-way/two-position hydraulic directional control valve.

12. The hydraulic system as claimed in claim 10, wherein the second valve is a hydraulic pilot actuated two-way/two-position hydraulic directional control valve.

13. The hydraulic system as claimed in claim 10, wherein the third valve is a hydraulic pilot actuated three-way/two-position hydraulic directional control valve.

14. A hydraulic system, comprising:

a pump;

a control valve in flow communication with the pump; and a load sense valve assembly in flow communication with the pump and the control valve, the load sense valve assembly comprising:

a first valve comprising a solenoid activated directional control valve;

a second valve connected to the first valve, the second valve comprising a hydraulic pilot actuated directional control valve; and a third valve connected to the first valve, the third valve comprising a hydraulic pilot actuated directional control valve, wherein the valve assembly has a second configuration in which hydraulic fluid supplied to the first valve is directed to the second valve and to downstream operators, and wherein the pump is controlled to maintain a pressure at an input port of the valve assembly equal to a pre-set load sense differential pressure plus a system demand operating pressure.

15. A hydraulic system, comprising:

a pump;

a control valve in flow communication with the pump; and a load sense valve assembly in flow communication with the pump and the control valve, the load sense valve assembly comprising:

a first valve comprising a solenoid activated directional control valve;

a second valve connected to the first valve, the second valve comprising a hydraulic pilot actuated directional control valve; and a third valve connected to the first valve, the third valve comprising a hydraulic pilot actuated directional control valve, wherein both the second valve and the third valve are connected to an output of the first valve such that a flow path state of the first valve simultaneously affects a flow path state of the second valve and third valve.

16. A load sense valve assembly for a hydraulic system, the load sense valve assembly comprising:

a first valve connected to a variable displacement hydraulic pump and a hydraulic system control valve, the first valve comprising a solenoid actuated three-way/two-position hydraulic directional control valve;

a second valve connected to the first valve and to a valve outlet port to selectively direct fluid to downstream system components, the second valve comprising a pilot actuated two-way/two-position directional control valve; and a third valve connected to the first valve, to a load sense flow and pressure signal line from the downstream system components, and to an outlet load sense flow and pressure signal line connected to the system control valve, wherein the second and third valves are connected to an output of the first valve such that a flow path state of the first valve simultaneously affects a flow path state of the second and third valves, wherein the valve assembly has a first configuration in which hydraulic fluid supplied to the first valve is directed to a pilot chamber of the second valve and a pilot chamber of the third valve such that fluid flow to the downstream components is blocked and the pump increases displacement to maintain a pre-set load sense differential standby pressure at an input port of the valve assembly, and wherein the valve assembly has a second configuration in which hydraulic fluid supplied to the first valve is directed to the second valve and to the downstream components, and wherein the pump is controlled to maintain a pressure at an input port of the valve assembly equal to a pre-set load sense differential pressure plus a system demand operating pressure.

* * * * *